(12) United States Patent
Lott

(10) Patent No.: US 8,392,689 B1
(45) Date of Patent: Mar. 5, 2013

(54) ADDRESS OPTIMIZED BUFFER TRANSFER REQUESTS

(75) Inventor: Glenn A. Lott, Berthoud, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 88 days.

(21) Appl. No.: 12/786,391

(22) Filed: May 24, 2010

(51) Int. Cl.
*G06F 12/00* (2006.01)

(52) U.S. Cl. ............... 711/201; 365/230.03; 710/23; 710/35; 710/52; 710/56; 710/57; 710/74; 711/5; 711/104; 711/105; 711/173; 711/202; 711/203

(58) Field of Classification Search .................. None
See application file for complete search history.

(56) References Cited

U.S. PATENT DOCUMENTS

| 5,249,280 | A * | 9/1993 | Nash et al. ................. 711/5 |
| 5,450,546 | A | 9/1995 | Krakirian ................. 710/57 |
| 5,537,552 | A | 7/1996 | Ogasawara et al. ............. 710/57 |
| 5,793,693 | A * | 8/1998 | Collins et al. ............ 365/230.01 |
| 5,822,142 | A | 10/1998 | Hicken ..................... 360/53 |
| 5,848,438 | A * | 12/1998 | Nemazie et al. ............. 711/201 |
| 6,191,712 | B1 | 2/2001 | Still ........................ 341/95 |
| 6,330,623 | B1 * | 12/2001 | Wu et al. .................. 710/23 |
| 6,340,973 | B1 * | 1/2002 | Ochiai et al. ............. 345/534 |
| 6,341,318 | B1 * | 1/2002 | Dakhil ..................... 710/23 |
| 6,381,659 | B2 * | 4/2002 | Proch et al. ................ 710/57 |
| 6,385,711 | B1 | 5/2002 | Colligan .................. 711/170 |
| 6,650,573 | B2 | 11/2003 | Sunaga et al. .......... 365/189.05 |
| 6,751,686 | B2 | 6/2004 | Takasugi et al. ................ 710/52 |
| 6,842,801 | B2 | 1/2005 | Yamada ..................... 710/56 |
| 6,906,980 | B2 * | 6/2005 | Kuo et al. ................. 365/230.03 |
| 6,981,122 | B2 * | 12/2005 | Volpe et al. ................ 711/202 |
| 7,085,087 | B2 | 8/2006 | Fukuhisa et al. ................ 360/55 |
| 7,114,041 | B2 | 9/2006 | Hammitt et al. ............... 711/149 |
| 7,158,438 | B2 * | 1/2007 | Kuo et al. ................. 365/230.03 |
| 7,249,206 | B2 | 7/2007 | Bilak et al. .................. 710/52 |
| 7,287,102 | B1 | 10/2007 | White et al. .................. 710/34 |
| 7,640,381 | B1 * | 12/2009 | Zhang et al. .................. 710/56 |
| 2002/0116580 | A1 * | 8/2002 | Carpenter et al. ............ 711/125 |
| 2004/0076044 | A1 | 4/2004 | Nowshadi .................... 365/200 |
| 2004/0080512 | A1 * | 4/2004 | McCormack et al. ........ 345/543 |
| 2005/0050289 | A1 * | 3/2005 | Raad ........................ 711/167 |
| 2005/0152211 | A1 * | 7/2005 | Henmi et al. ................. 365/233 |
| 2006/0047937 | A1 * | 3/2006 | Selvaggi et al. ............. 711/220 |
| 2007/0260844 | A1 * | 11/2007 | Croxford .................... 711/203 |
| 2008/0320254 | A1 * | 12/2008 | Wingard et al. .............. 711/157 |
| 2011/0231519 | A1 * | 9/2011 | Luby et al. ................... 709/219 |

OTHER PUBLICATIONS

'OPB Synchronous DRAM (SDRAM) Controller (v1.00e)—Product Specification' by Xilinx, Jul. 21, 2005.*
XILINX LogicCORE, Production Specification, OPB Synchronous DDRAM (SDRAM) Controller (v1.00e), www.xilinx.com (DS426 Jul. 21, 2005).
JESD79-2E_DDR2_SDRAM_Specification, Apr. 2008.

* cited by examiner

*Primary Examiner* — Steven Snyder

(57) ABSTRACT

In one embodiment, a data storage device comprises a buffer, a buffer manager, and a buffer client. The buffer client is configured to receive data to be stored in the buffer, to compute a difference between a bank boundary address of the buffer and a starting buffer address for the data, to generate a first data burst having a length equal to the computed difference and including a first portion of the data, and to send the first data burst to the buffer manager, wherein the buffer manager is configured to write the first data burst to the buffer.

18 Claims, 6 Drawing Sheets

ADDRESS OPTIMIZED BUFFER TRANSFER REQUESTS

BACKGROUND

Data storage devices are commonly used to store data in computers, data bases, digital video recorders, and other devices. A data storage device may comprise a storage media, such as a hard disk and/or solid state memory, and a buffer for temporarily storing data to be written to the storage media and/or read from the storage media. It is desirable to arrange the transfer of data to and/or from the buffer in way that optimizes the data throughput of the buffer.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
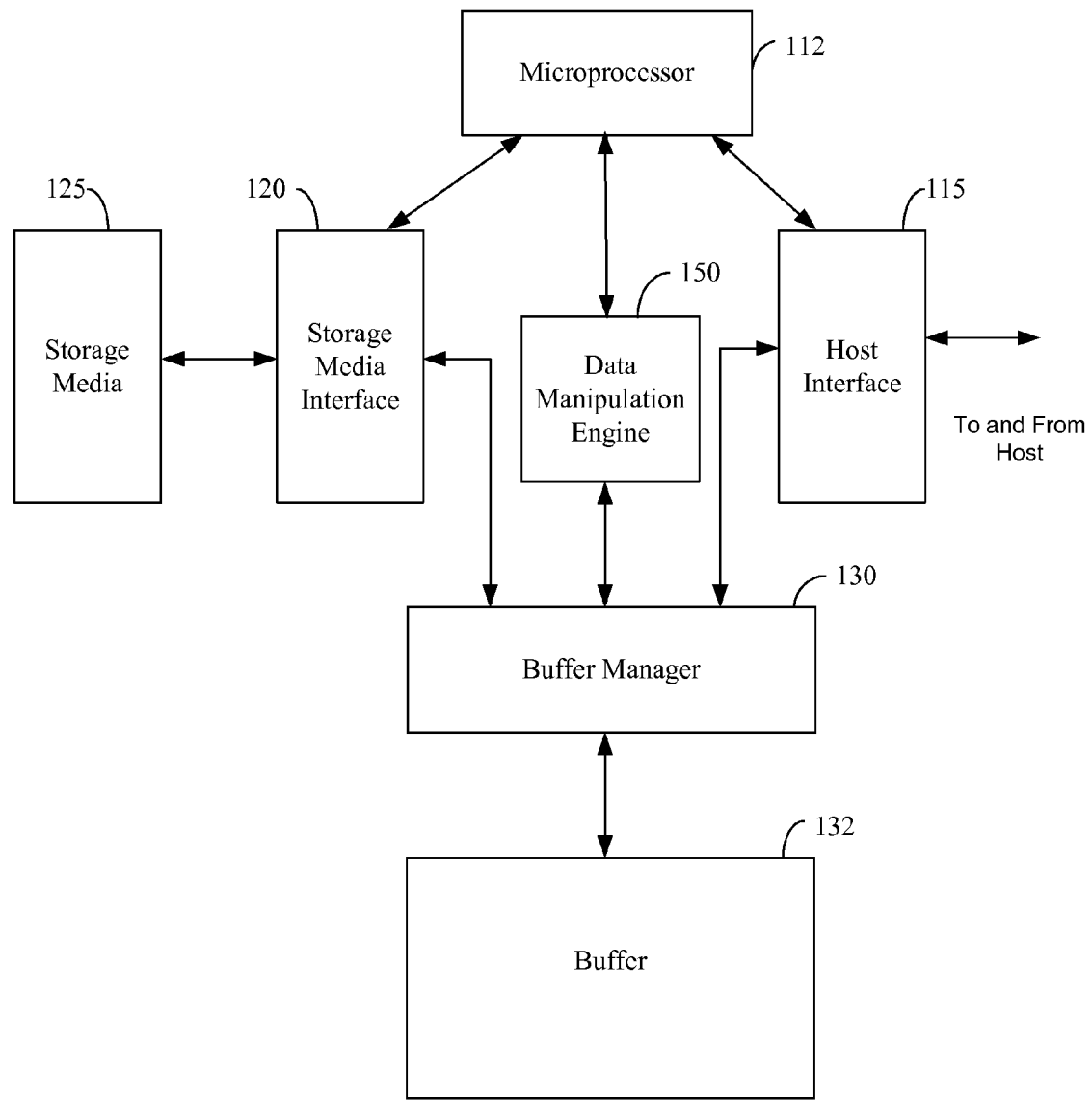
FIG. 1 is a block diagram of a data storage device according to an embodiment of the present invention.

FIG. 1 shows a data storage device 110 according to an embodiment of the present invention. The data storage device 110 includes a storage media 125, which may comprise a hard disk, solid state memory (e.g., flash memory), or other type of memory. The data storage device 110 also includes a host interface 115, a buffer 132, a buffer manager 130, a storage media interface 120, and a microprocessor 112. The host interface 115 interfaces the data storage device 110 to a host device (e.g., a host processor). The storage media interface 120 reads data from and writes data to the storage media 125. For the example where the storage media 125 comprises a hard disk, the storage media interface 120 may include a read/write head to magnetically read data from and write data to the hard disk. The buffer 132 may be used to temporarily store data in the data storage device 110, as discussed further below.

The microprocessor 112 may control operations of the data storage device 110 to execute read/write commands from the host device. For a host read command, the microprocessor 112 may instruct the storage media interface 120 to retrieve data from the storage media 125 requested by the host read command and store the data in the buffer 132. The microprocessor 112 may then instruct the host device interface 115 to retrieve the data from the buffer 132 and send the data to the host device. For a host write command, the microprocessor 112 may instruct the host interface 115 to store the data from the host device in the buffer 130 and instruct the storage media interface 120 to retrieve the data from the buffer 132 and write the data to the storage media 125. The microprocessor 112 may also manage at which buffer addresses data is stored in the buffer 132 based on a buffer management scheme.

The data storage device 110 may also include a data manipulation engine 150 configured to perform data manipulation operations (e.g., logic operations) on data in the data storage device 110. For example, the microprocessor 112 may instruct the data manipulation engine 150 to retrieve data from the buffer 132, perform a data manipulation operation on the data, and store the resultant data in the buffer 132.

The buffer 132 may comprise dynamic random access memory (DRAM), synchronous DRAM (SDRAM), double data rate (DDR) SDRAM, and/or other type of memory. The buffer manager 130 manages the flow of data between the buffer 132 and various buffer clients in the data storage device 110 that access the buffer 132. The buffer clients may include the storage media interface 120, the data manipulation engine 150, and the host interface 115. If multiple buffer clients attempt to access the buffer 132, then the buffer manager 130 may manage access to the buffer 132 among the different buffer clients.

Figure 2:
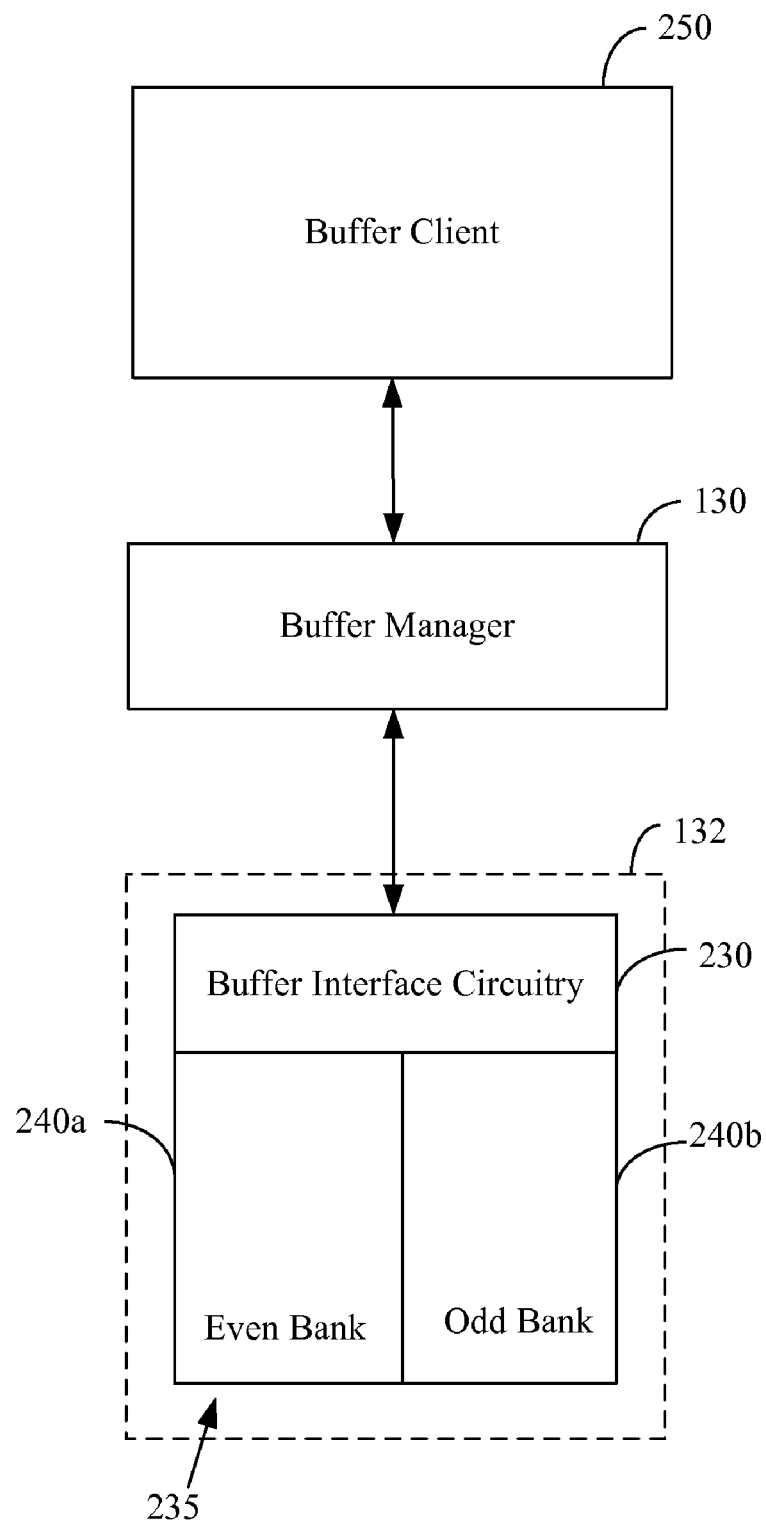
FIG. 2 shows an example of a buffer client that accesses a buffer through a buffer manager according to an embodiment of the present invention.

FIG. 2 shows an example of a buffer client 250 that accesses the buffer 132 through the buffer manager 130 according to an embodiment of the present invention. The buffer client 250 may include the storage media interface 120, the data manipulation engine 150, the host interface 115 or other component in the data storage device 110 that accesses the buffer 132. Although one buffer client 250 is shown in FIG. 2 for ease of discussion, one skilled in the art will appreciate that the data storage device 110 may include multiple buffer clients that access the buffer 132 through the buffer manager 130.

The buffer 132 comprises buffer interface circuitry 230 and memory 235 for storing data. The buffer interface circuitry 230 receives write/read buffer commands from the buffer manager 130 and writes data to and/or reads data from the memory 235 based on the buffer commands. In one embodiment, the memory 235 comprises an even bank 240a and an odd bank 240b. Although two banks are shown in FIG. 2, those skilled in the art will appreciate that the buffer 132 may include any number of even and odd banks.

The buffer interface circuitry 230 may alternately transfer data to the even and odd banks 240a and 240b and/or alternately transfer data from the even and odd banks 240a and 240b. In this embodiment, the buffer interface circuitry 230 may transfer data to or from one of the banks 240a and 240b while precharging the other bank 240a and 240b to prepare the other bank 240a and 240b for the next data transfer. Precharging a bank 240a and 240b may involve precharging sense amplifiers and/or other circuitry used for transferring data to or from the bank. An advantage of this embodiment is that it hides latencies associated with precharging the banks 240a and 240b. This is because, while one bank 240a and 240b is precharging, data is being transferred to or from the other bank 240a and 240b. As a result, the effective buffer throughput is increased.

In one embodiment, a sequence of buffer addresses in the buffer 132 may be allocated between the even and odd banks 240a and 240b such that alternating portions of the buffer address sequence are located in the even and odd banks 240a and 240b. For example, a first portion of the buffer address sequence may be in the even bank 240a and a second portion of the buffer address sequence adjacent to the first portion may be in the odd bank 240b, where each portion spans one bank length (e.g., 32 DWords, where each DWord is 4 bytes or 32 bits). Each buffer address may hold one DWord. In this embodiment, a buffer address located at an even or odd bank boundary may be referred to as a bank boundary address. For the example where one bank length is 32 DWords, a bank boundary address may occur every 32 DWords.

In this embodiment, the buffer manager 130 may optimize the transfer of a data sequence to or from the buffer 132 by sending overlapping buffer commands to the buffer 132. In this embodiment, the buffer interface circuitry 235 may transfer a first portion of the data sequence spanning one bank length to or from the even bank 240a in response to a first one of the overlapping buffer commands while precharging the odd bank 240b in response to a second one of the overlapping buffer commands. The precharging prepares the odd bank 240b for the transfer of a second portion of the data sequence spanning one bank length. As a result, when the buffer interface circuitry 235 finishes transferring the first portion of the data sequence to or from the even bank 240a, the odd bank 240b is ready for the buffer interface circuitry 235 to transfer the second portion of the data sequence to or from the odd bank 240b. Thus, the overlapping buffer commands allows the buffer manager 130 to transfer data to or from one of the even and odd banks 240a and 240b while the other bank is being precharged, thereby optimizing buffer throughput.

When the buffer client 250 needs to transfer data to the buffer 132, the buffer client 250 may send a plurality of transfer requests to the buffer manager 130, where each transfer request requests the transfer of a portion of the data from the buffer client 250 to the buffer manager 130 in a data burst. When the buffer manager 130 is ready to service one of the transfer requests, the buffer manager 130 may send a signal to the buffer client 250 indicating that it is ready to receive the data burst corresponding to the request. The buffer client 250 may then transfer the data burst to the buffer manager 130. After receiving the data burst, the buffer manager 130 may send one or more buffer commands to the buffer 132 to write the received data burst to the buffer 132. This process may be repeated until all of the data is transferred to the buffer 132. The buffer manager 130 may also receive transfer requests from other buffer clients in the data storage device 110 and determine in which order to service the requests. For example, the buffer manager 130 may group transfer requests in the same direction together to minimize the change in direction of data transfers.

To optimize buffer throughput for a data burst, the buffer client 250 may transfer a data burst to the buffer manager 130, in which the data burst spans two bank lengths (e.g., 64 DWords) and is aligned with an even bank boundary. This allows the buffer manager 130 to transfer the received data burst to the even and odd banks 240a and 240b of the buffer 132 using overlapping buffer commands as discussed above.

When the buffer client 250 needs to transfer data from the buffer 132, the buffer client 250 may send a plurality of transfer requests to the buffer manager 130, where each transfer request requests a portion of the data from the buffer manager 130 in a data burst. When the buffer manager 130 is ready to service one of the transfer requests from the buffer client 250, the buffer manager 130 may read the data burst corresponding to the request from the buffer 132 and transfer the read data burst to the buffer client 250. This processes may be repeated until all of the data is transferred to the buffer client 250.

To optimize buffer throughput for a data burst, the buffer manager 130 may transfer a data burst to the buffer client 250, in which the data burst spans two bank lengths (e.g., 64 DWords) and is aligned with an even bank boundary. This allows the buffer manager 130 to read the data burst from the even and odd banks 240a and 240b of the buffer 132 using overlapping buffer commands as discussed above.

However, the data that the client buffer 250 needs to transfer to or from the buffer 132 may not be aligned with an even bank boundary. For the example where the client buffer 250 includes the host interface 115, the microprocessor 112 may instruct the host interface 115 to transfer data to and/or from the buffer 132 starting at a buffer address that is not aligned with an even bank boundary. This may be due to the fact that data is sent to and/or received from the host device in sectors, in which the sector size is not an integer multiple of two bank lengths.

In one embodiment, the client buffer 250 is configured to transfer data to and/or from the buffer manager 130 in data bursts that optimize buffer throughput even when the starting buffer address for the data is not aligned with an even bank boundary.

In this embodiment, the client buffer 250 determines a first data burst for transferring a first portion of the data to or from the buffer 132 through the buffer manager 130. The client buffer 250 computes the length of the first data burst as the difference between the starting buffer address for the data and the next even bank boundary address. This ensures that the next data burst is aligned with an even bank boundary, as discussed further below. The client buffer 250 then sends a transfer request to the buffer manager 130 to transfer the first portion of the data in the first data burst.

Figure 3A:
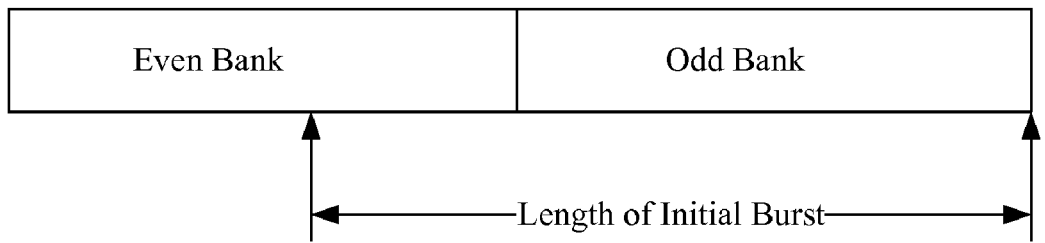
FIG. 3A shows an example of an first data burst according to an embodiment of the present invention.

An example of the first data burst is shown in FIG. 3A, in which the first data burst starts at a buffer address that is not aligned with an even bank boundary and ends at an odd bank boundary. The first data burst has a length equal to the difference between the starting buffer address and the next even bank boundary. The length of the first data burst may be given in units of DWords.

After the first data burst, the client buffer 250 determines one or more middle data bursts for transferring subsequent portions of the data to or from the buffer 132 through the buffer manager 130. A middle data burst may refer to a data burst that is between the first data burst and a last data burst, discussed below. In one embodiment, each middle data burst may have a length equal to an integer multiple of two bank lengths and be aligned with an even bank boundary. This allows the buffer manager 130 to transfer each middle data burst to or from the buffer 132 using overlapping buffer commands to optimize buffer throughput. For each middle data burst, the client buffer 250 may send a transfer request to the buffer manager 130 to transfer the middle data burst.

Figure 3B:
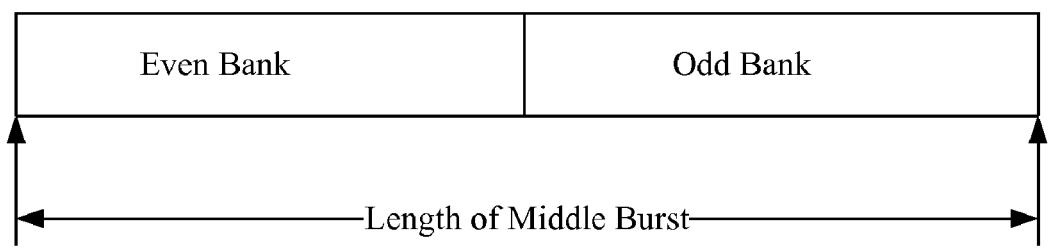
FIG. 3B shows an example of a middle data burst according to an embodiment of the present invention.

An example of a middle data burst is shown in FIG. 3B, in which the middle data burst starts at an even bank boundary and ends at an odd bank boundary, and has a length of two data bursts. For the example in which one bank length equals 32 DWord, the middle data burst may have a length of 64 DWords.

When the amount of data remaining to be transferred to and/or from the buffer 132 is equal to or less than two bank lengths, the buffer client 250 determines the last data burst to transfer the remaining data to or from the buffer 132 through the buffer manager 130. The last data burst has a length equal to the amount of data remaining to be transferred and is aligned with an even bank boundary. The last data burst may or may not end at an odd bank boundary. The client buffer 250 may send a transfer request to the buffer manager 130 to transfer the last data burst.

Figure 3C:
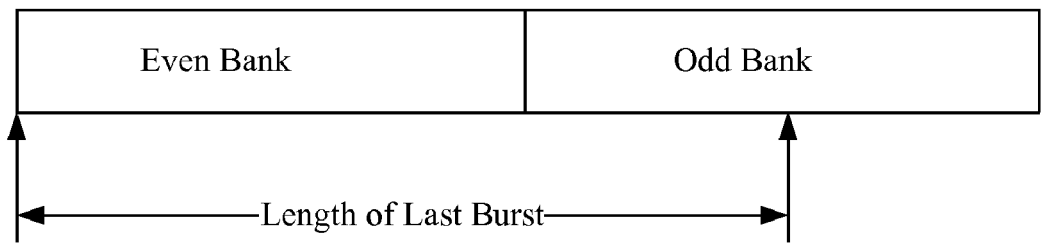
FIG. 3C shows an example of a last data burst according to an embodiment of the present invention.

An example of the last data burst is shown in FIG. 3C, in which the final data burst starts at an even bank boundary and ends at a buffer address that is not aligned with an odd bank boundary. The length of the last data burst is equal to the amount of data remaining to be transferred.

Thus, the buffer client 250 according to embodiments of the present invention advantageously optimizes buffer throughput even when the starting buffer address of the data to be transferred to and/or from the buffer 132 is not aligned with an even bank boundary. This is because the first data burst aligns the next data burst with an even bank boundary. As a result, each of the middle data bursts can be aligned with an even bank boundary and have a length of two bank lengths. This allows the buffer manager 130 to transfer the middle data bursts to and/or from the buffer 132 using overlapping buffer commands to optimize buffer throughput.

Figure 4:
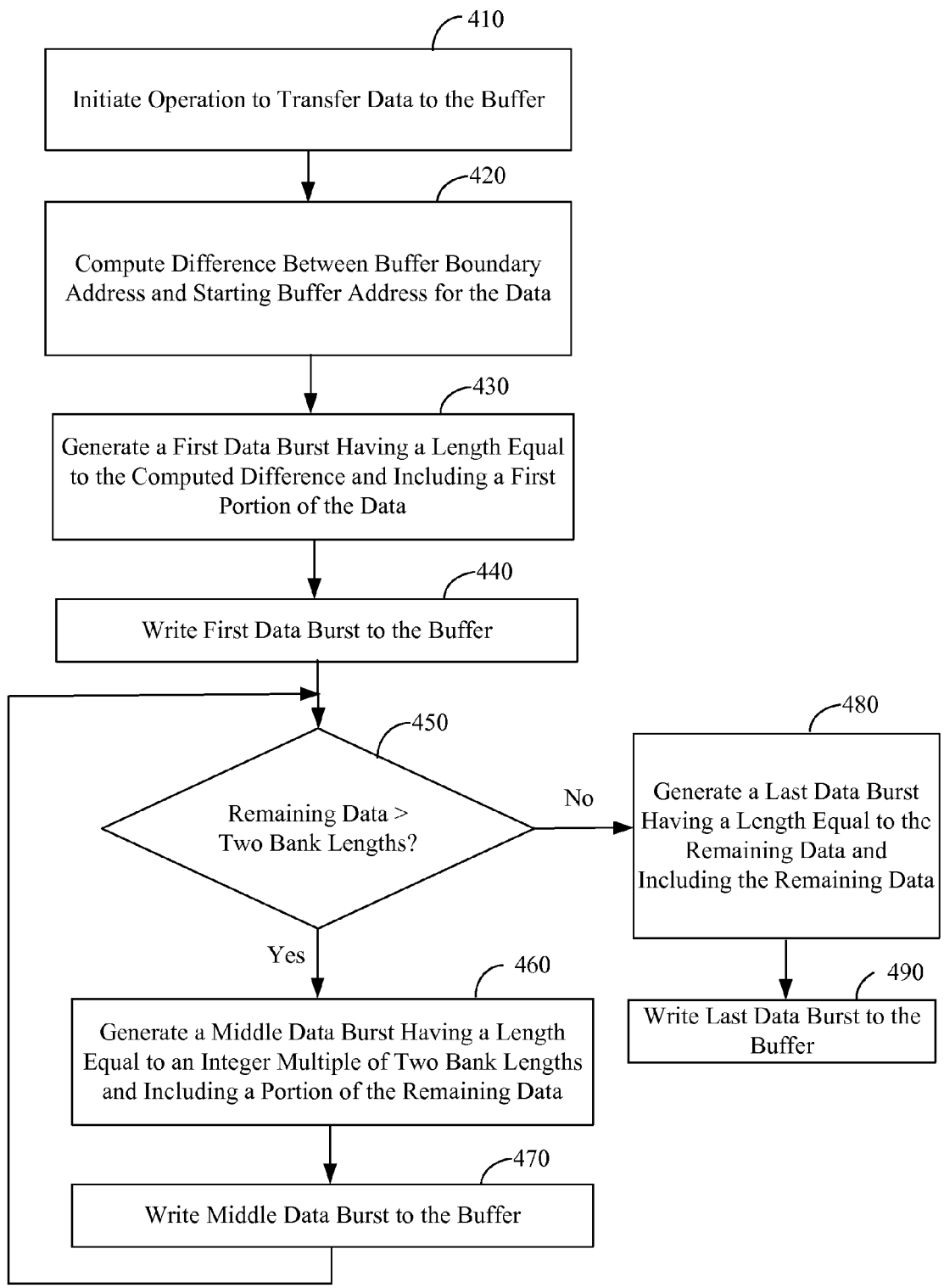
FIG. 4 is a flow diagram of a method for writing data to a buffer according to an embodiment of the present invention.

FIG. 4 is a flow diagram of a method for writing data from the buffer client 250 to the buffer 132 according to an embodiment of the present invention.

In step 410, an operation to transfer data to the buffer 132 is initiated. The data may be a data sequence to be written to sequential buffer addresses in the buffer 132 starting at a buffer address that is not aligned with a bank boundary.

In step 420, the difference between a buffer boundary address and the starting buffer address for the data is computed. The buffer boundary address may be aligned with an even bank boundary.

In step 430, a first data burst is generated having a length equal to the computed difference and including a first portion of the data to be written to the buffer 132.

In step 440, the first data burst is written to the buffer 132. This may involve the buffer client 250 sending a transfer request to the buffer manager 130 for the first data burst and the buffer client 250 transferring the first data burst to the buffer manager 130 when the buffer manager 130 is ready to receive the first data burst. The buffer manager 130 may then write the first data burst to the buffer 132.

In step 450, a determination is made whether the remaining data to be transferred exceeds two bank lengths. If the remaining exceeds two bank lengths, then the method proceeds to step 460. Otherwise, the method proceeds to step 480.

In step 460, a middle data burst is generated having a length equal to an integer multiple of two bank lengths and including a portion of the remaining data to be written to the buffer 130. The middle data burst may be aligned with an even bank boundary.

In step 470, the middle data burst is written to the buffer 132. This may involve the buffer client 250 sending a transfer request to the buffer manager 130 for the middle data burst and the buffer client 250 transferring the middle data burst to the buffer manager 130 when the buffer manager 130 is ready to receive the middle data burst. The buffer manager 130 may then write the middle data burst to the buffer 132 using overlapping buffer command to optimize buffer throughput. After step 470, the method proceeds back to step 450.

In step 480, a last data burst is generated having a length equal to the remaining data to be written to the buffer 130 and including the remaining data. In step 490, the last data burst is written to the buffer 132. This may involve the buffer client 250 sending a transfer request to the buffer manager 130 for the last data burst and the buffer client 250 transferring the last data burst to the buffer manager 130 when the buffer manager 130 is ready to receive the last data burst. The buffer manager 130 may then write the last data burst to the buffer 132.

Figure 5:
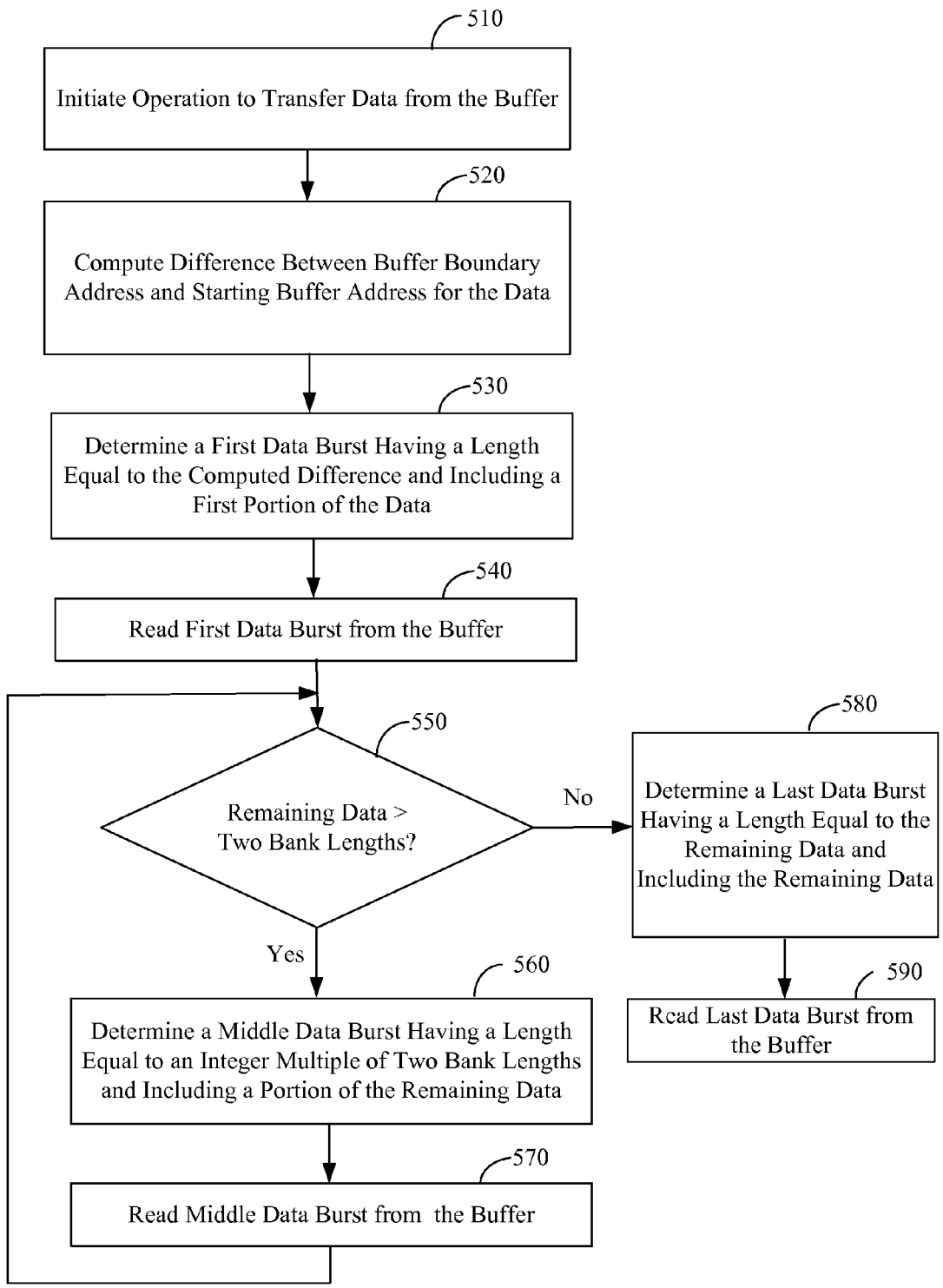
FIG. 5 is a flow diagram of a method for reading data from a buffer according to an embodiment of the present invention.

FIG. 5 is a flow diagram of a method for reading data from the buffer 132 to the buffer client 250 according to an embodiment of the present invention.

In step 510, an operation to transfer data from the buffer 132 is initiated. The data may be a data sequence that is stored in sequential buffer addresses in the buffer 132 starting at a buffer address that is not aligned with a bank boundary.

In step 520, the difference between a buffer boundary address and the starting buffer address for the data is computed. The buffer boundary address may be aligned with an even bank boundary.

In step 530, a first data burst is determined having a length equal to the computed difference and including a first portion of the data to be read from the buffer 132.

In step 540, the first data burst is read the buffer 132. This may involve the buffer client 250 sending a transfer request to the buffer manager 130 for the first data burst. The buffer manager 130 services the request by reading the first data burst from the buffer 132 and transferring the first data burst to the buffer client 250.

In step 550, a determination is made whether the remaining data to be transferred exceeds two bank lengths. If the remaining exceeds two bank lengths, then the method proceeds to step 560. Otherwise, the method proceeds to step 580.

In step 560, a middle data burst is determined having a length equal to a multiple integer of two bank lengths and including a portion of the remaining data to be read from the buffer 130. The middle data burst may be aligned with an even bank boundary.

In step 570, the middle data burst is read from the buffer 132. This may involve the buffer client 250 sending a transfer request to the buffer manager 130 for the middle data burst. The buffer manager 130 services the request by reading the middle burst from the buffer 132 and transferring the middle data burst to the buffer client 250. Since the middle data burst is aligned with an even bank boundary and is a multiple integer of two bank lengths, the buffer manager 130 can read the middle data burst from the buffer 132 using overlapping buffer commands. After step 570, the method proceeds back to step 550.

In step 580, a last data burst is determined having a length equal to the remaining data to be read from the buffer 130 and including the remaining data. In step 590, the last data burst is read from the buffer 132. This may involve the buffer client 250 sending a transfer request to the buffer manager 130 for the last data burst. The buffer manager 130 services the request by reading the last data burst from the buffer 132 and transferring the last data burst to the buffer client 250.

Figure 6:
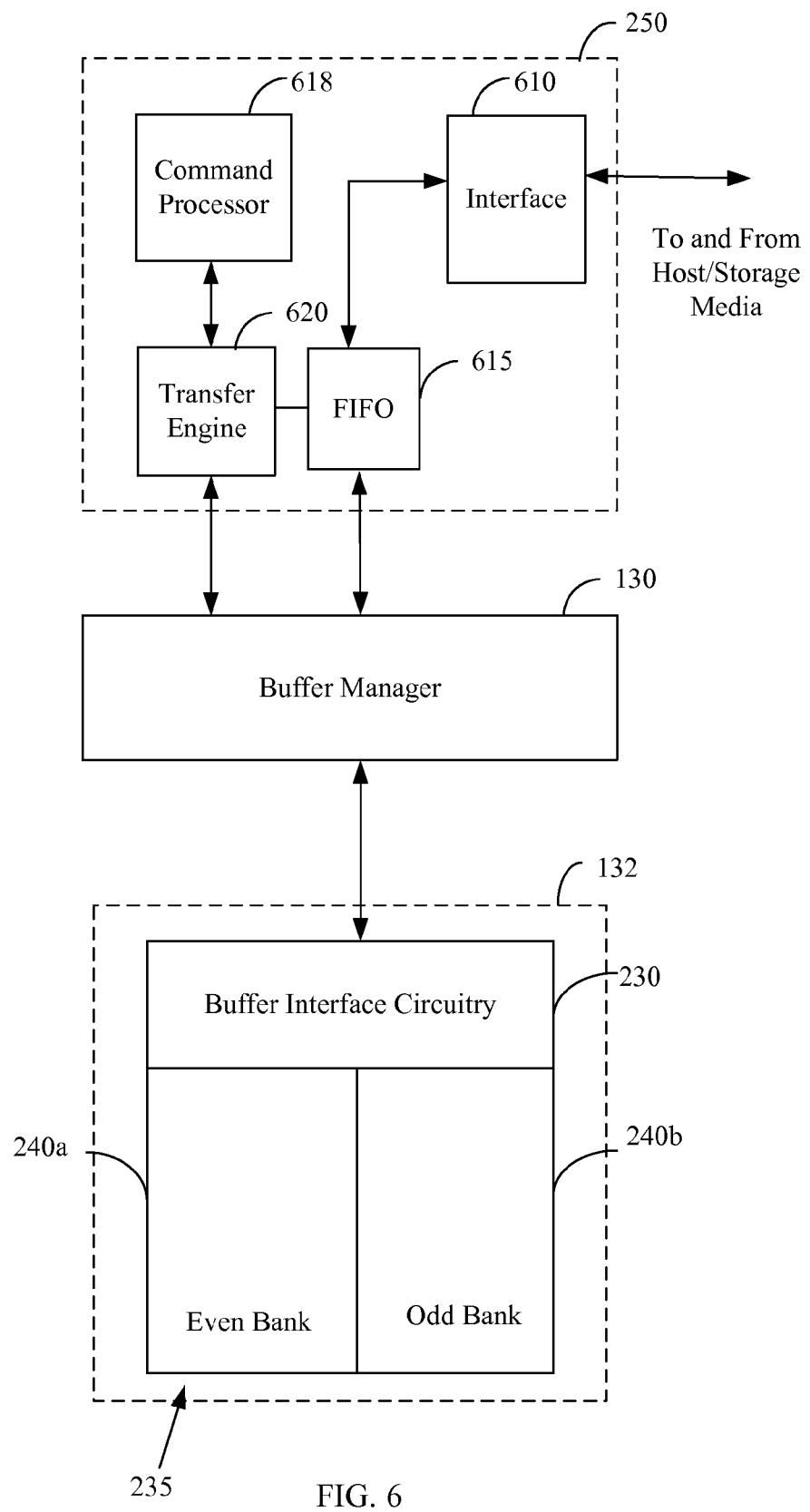
FIG. 6 shows another example of a buffer client that accesses the buffer through the buffer manager according to another embodiment of the present invention.

FIG. 6 shows the buffer client 250 according to an embodiment of the present invention. The buffer client 250 may be used to implement the host interface 115 or the storage media interface 120 shown in FIG. 1.

In one embodiment, the buffer client 250 includes an interface 610, a command processor 618, a transfer engine 620 and a first-in first-out memory (FIFO) 615. The interface 610 is configured to receive data from and/or send data to the host device or the storage media 125. The FIFO 615 is configured to temporarily store data to be transferred to the buffer manager 130 and/or data received from the buffer manager 130. The command processor 618 is configured to instruct the transfer engine 620 to transfer data to and/or from the buffer 132 through the buffer manager 130 based on a host transfer command or a storage media transfer command, as discussed further below. Some or all of the functions of the command processor 618 may be performed by the microprocessor 112.

Operations for writing data to the buffer 132 according to an embodiment will now be described with reference to FIG. 6.

The command processor 618 initiates a data transfer operation based on a host transfer command or a storage media transfer command. For example, the host transfer command may be issued by the microprocessor 112 to write data received from the host device to the buffer 132. In another example, a storage media transfer command may be issued by the microprocessor 112 to write data read from the storage media 125 to the buffer 132.

In one embodiment, the command processor 618 may send information to the transfer engine 620 to perform the data transfer operation including the transfer direction, the starting buffer address and/or the amount of data to be transferred. For a write, the transfer direction is towards the buffer 132.

After receiving the information from the command processor 618, the transfer engine 620 may perform the transfer operation as data is received in the FIFO 615 from the host device or the storage media 125. To begin the transfer operation, the transfer engine 620 may send the starting buffer address to the buffer manager 130.

The transfer engine 620 may then compute the difference between the starting buffer address and an even bank boundary address, and use the computed difference as the length for the first data burst. The transfer engine 620 may also set an internal flag indicating that the upcoming data burst is the first data burst and the computed difference should be used for the length of the data burst.

The transfer engine 620 may then monitor the amount of data in the FIFO 615 as the FIFO 615 receives data from the host device or storage media 125. When there is enough data in the FIFO 615 to transfer the first data burst, the transfer engine 620 may send a transfer request to the buffer manager 130 for the first data burst. The buffer manager 130 may send a data strobe to the transfer engine 620 when the buffer manager 130 is ready to receive the first data burst from the buffer client 250 and send an acknowledge to the transfer engine 620 when the first data burst has been captured. At this time, the internal flag indicating the first data burst condition may be cleared.

The buffer manager 130 may then write the first data burst to the buffer 132 starting at the starting buffer address. For the example where the data is written to sequential buffer addresses, the buffer manager 130 may maintain a local buffer address indicating the next buffer address to be written. In this example, the buffer manager 130 may initialize the local buffer address at the starting buffer address and increment the local buffer address as data is written to the buffer 132.

The transfer engine 620 may then generate a middle data burst to transfer a subsequent portion of the data to be written to the buffer 132. The middle data burst may be an integer multiple of two banks lengths in length. In this embodiment, the transfer engine 620 may monitor the amount of data in the FIFO 615 and send a transfer request to the buffer manager 130 when there is enough data in the FIFO 615 to transfer a middle data burst spanning two bank lengths. The amount of data in the FIFO 615 may increase while the transfer engine 620 is waiting to be serviced by the buffer manager 130. If the amount of data increases to the next multiple of two bank lengths, then a burst count indicating the length of the middle burst is updated to reflect the new transfer length. This allows the burst count to be updated until an acknowledgement is asserted by the buffer manager 130. The burst count may be sent to the buffer manager 130 to indicate the transfer length for the middle data burst.

When the buffer manager 130 is ready to service the request for the middle data burst, the transfer engine 620 transfers the middle data burst to the buffer manager 130. The buffer manager 130 may then write the middle data burst to the buffer 132 using overlapping buffer commands to optimize buffer throughput. The process of transferring middle data bursts may be repeated until the remaining data to be written to the buffer 132 is equal to or less then two bank lengths.

When the remaining data is received in the FIFO 615, the transfer engine 620 may send a request to the buffer manager 130 to transfer the last data burst. When the buffer manager 130 is ready to service the request for the last data burst, the transfer engine 620 transfers the last data burst to the buffer manager 130, and the buffer manager 130 writes the data burst to the buffer 132.

Operations for reading data from the buffer 132 according to an embodiment will now be described with reference to FIG. 6.

The command processor 618 initiates a data transfer operation based on a host transfer command or a storage media transfer command. For example, the host transfer command may be issued by the microprocessor 112 to read data from the buffer 132 and send the data to the host device.

In one embodiment, the command processor 618 may send information to the transfer engine 620 to perform the data transfer operation including the transfer direction, the starting buffer address and/or the amount of data to be transferred. For a read, the transfer direction is towards the buffer client 250.

After receiving the information from the command processor 618, the transfer engine 620 may send the starting buffer address to the buffer manager 130. The transfer engine 620 may then compute the difference between the starting buffer address and an even bank boundary address, and use the computed difference as the length for the first data burst. The transfer engine 620 may also set an internal flag indicating that the upcoming data burst is the first data burst and the computed difference should be used for the length of the data burst.

When there is enough space in the FIFO 615 to receive the first data burst, the transfer engine 620 may send a transfer request to the buffer manager 130 for the first data burst. When the buffer manager 130 is ready to service the request, the buffer manager 130 may read the first data burst from the buffer 132. The buffer manager 130 may then may send a data strobe to the transfer engine 620 when the buffer manager 130 is ready to transfer the first data burst to the buffer client 250. At this time, the internal flag indicating the first data burst condition may be cleared.

For the example where the data is read from sequential buffer addresses, the buffer manager 130 may maintain a local buffer address indicating the next buffer address to be read. In this example, the buffer manager 130 may initialize the local buffer address at the starting buffer address and increment the local buffer address as data is read from the buffer 132.

The transfer engine 620 may then determine a middle data burst to transfer a subsequent portion of the data to be read from the buffer 132. The middle data burst may be an integer multiple of two banks lengths in length. In this embodiment, the transfer engine 620 may monitor the amount of space available in the FIFO 615 as data in the FIFO is sent to the host device or storage media 125. The transfer engine 620 may then send a transfer request to the buffer manager 130 when there is enough space in the FIFO 615 to receive a middle data burst spanning two bank lengths. The amount of available space in the FIFO 615 may increase while the transfer engine 520 is waiting to be serviced by the buffer manager 130. If the available space increases to the next multiple of two bank lengths, then a burst count indicating the length of the middle burst is updated to reflect the new transfer length.

When the buffer manager 130 is ready to service the request for the middle data burst, the buffer manager 130 may read the middle data burst from the buffer 132 and transfer the middle burst to the buffer client 250. The process of transferring middle data bursts may be repeated until the remaining data to be read from the buffer 132 is equal to or less then two bank lengths.

When there is enough space in the FIFO 615 to receive the remaining data, the transfer engine 620 may send a request to the buffer manager 130 for the last data burst. When the buffer manager 130 is ready to service the request for the last data burst, the buffer manager 130 may read the last data burst from the buffer 132 and transfer the last data burst to the buffer client 250.

In one embodiment, after the transfer engine 620 computes the difference between the starting buffer address and the bank boundary address, the transfer engine 620 may compare the computed difference to the amount of data that needs to be transferred to or from the buffer 132. If the amount of data is less than the computed difference, then the transfer engine 620 may transfer the data in one data burst having a length equal to the amount of data to be transferred. If the amount of data exceeds the computed difference, then the transfer engine 610 may transfer the data as discussed above.

In one embodiment, the data to be transferred to or from the buffer 132 may comprise one or more sectors. For example, each sector may correspond to a logical block address used by the host device to address data stored in the data storage device 110. In this embodiment, when the command processor 618 initiates a data transfer operation, the command processor 618 may send the transfer engine 620 the number of sectors in the data to be transferred and the sector size.

In this embodiment, the transfer engine 620 may sequentially transfer the sectors to or from the buffer 132, in which the first data burst is used to transfer a first portion of the sector sequence, one or more middle data bursts are used to transfer subsequent portions of the sector sequence, and the last data burst is used to transfer a remaining portion of the sector sequence. In this example, a middle data burst may include a remaining portion of one sector and a beginning portion of the next sector in the sector sequence.

It may become necessary to pause transfer at a sector boundary due to data/space availability. In this case, after the pause, the transfer engine 620 may transfer the next portion of the sector sequence using a data burst having a length equal to the difference between the next buffer address and an even bank boundary. This re-establishes alignment of the subsequent data burst to an even bank boundary.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device, comprising:
a buffer;
a buffer manager; and
a buffer client configured to:
  receive data to be stored in the buffer,
  compute a difference between a bank boundary address of the buffer and a starting buffer address for the data,
  generate a first data burst having a length equal to the computed difference and including a first portion of the data,
  send the first data burst to the buffer manager,
  generate a second data burst having a length corresponding to a burst count and including a second portion of the data, wherein the burst count indicates the length of the second data burst in relation to two bank lengths of the buffer and is updated each time the length of the second portion of the data increases to a next multiple of two bank lengths of the buffer, and
  send the second data burst to the buffer manager;
wherein the buffer manager is configured to write the first data burst and the second data burst to the buffer.

2. The data storage device of claim 1, wherein the buffer manager is configured to write the second portion of the data to the buffer by sending overlapping buffer commands to the buffer to concurrently transfer data from the buffer manager to a first bank of the buffer and prepare a second bank of the buffer for a subsequent data transfer from the buffer manager to the second bank.

3. The data storage device of claim 2, wherein the second bank of the buffer is prepared for the subsequent data transfer by precharging the second bank.

4. The data storage device of claim 1, wherein the second data burst is aligned with a bank boundary of the buffer.

5. The data storage device of claim 1, wherein the buffer client is configured to generate a last data burst having a length less than two bank lengths of the buffer and including a last portion of the data, and to send the last data burst to the buffer manager, wherein the buffer manager is configured to write the last data burst to the buffer.

6. The data storage device of claim 5, wherein one end of the last data burst is aligned with a bank boundary of the buffer.

7. The data storage device of claim 1, wherein the buffer client comprises a host interface configured to receive the data from a host device.

8. The data storage device of claim 1, wherein the buffer client comprises a storage media interface configured to receive the data from a storage media.

9. The data storage device of claim 8, wherein the storage media comprises a hard disk.

10. A data storage device, comprising:
a buffer;
a buffer manager; and
a buffer client including a memory and configured to:
compute a difference between a bank boundary address of the buffer and a starting buffer address of data in the buffer,
generate a request for a first data burst having a length equal to the computed difference and including a first portion of the data in the buffer,
send the request for the first data burst to the buffer manager,
generate a request for a second data burst having a length corresponding to a burst count and including a second portion of the data, wherein the burst count indicates a length of the second data burst in relation to two bank lengths of the buffer and is updated each time an amount of available space in the memory of the buffer client increases to a next multiple of two bank lengths of the buffer, and
send the request for the second data burst to the buffer manager;
wherein, in response to the request for the first data burst, the buffer manager is configured to read the first data burst from the buffer and to transfer the first data burst to the buffer client, and
wherein, in response to the request for the second data burst, the buffer manager is configured to read the second data burst from the buffer and to transfer the second data burst to the buffer client.

11. The data storage device of claim 10, wherein the buffer manager is configured to read the second data burst from the buffer by sending overlapping buffer commands to the buffer to concurrently transfer data from a first bank of the buffer to the buffer manager and prepare a second bank of the buffer for a subsequent data transfer from the second bank to the buffer manager.

12. The data storage device of claim 10, wherein the second data burst is aligned with a bank boundary of the buffer.

13. A method for transferring data to a buffer, comprising:
receiving data to be stored in the buffer;
computing a difference between a bank boundary address of the buffer and a starting buffer address for the data;
generating a first data burst having a length equal to the computed difference and including a first portion of the data;
writing the first data burst to the buffer;
generating a second data burst having a length corresponding to a burst count and including a second portion of the data, wherein the burst count indicates the length of the second data burst in relation to two bank lengths of the buffer and is updated each time the second portion of the data increases to a next multiple of two bank lengths of the buffer; and
writing the second data burst to the buffer.

14. The method of claim 13, wherein the writing the second data burst to the buffer comprises sending overlapping buffer commands to the buffer to concurrently transfer data to a first bank of the buffer and prepare a second bank of the buffer for a subsequent data transfer to the second bank.

15. The method of claim 14, wherein the second bank of the buffer is prepared for the subsequent data transfer by precharging the second bank.

16. The method of claim 13, wherein the second data burst is aligned with a bank boundary of the buffer.

17. The method of claim 13, further comprising:
generating a last data burst having a length less than two bank lengths of the buffer and including a last portion of the data; and
writing the last data burst to the buffer.

18. The method of claim 17, wherein one end of the last data burst is aligned with a bank boundary of the buffer.

* * * * *